United States Patent
Fox et al.

(10) Patent No.: US 6,789,163 B2
(45) Date of Patent: Sep. 7, 2004

(54) OPTIMIZING DATA TRANSFER PERFORMANCE THROUGH PARTIAL WRITE COMMAND PURGING IN A DISC DRIVE

(75) Inventors: Travis D. Fox, Edmond, OK (US); Edwin Scott Olds, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 217 days.

(21) Appl. No.: 10/029,459

(22) Filed: Dec. 21, 2001

(65) Prior Publication Data

US 2003/0056059 A1 Mar. 20, 2003

Related U.S. Application Data (60) Provisional application No. 60/322,823, filed on Sep. 17, 2001.

(51) Int. Cl.[7] .................................. F06F 13/20
(52) U.S. Cl. ........................................ 711/112
(58) Field of Search ............................. 711/112; 710/6

(56) References Cited

U.S. PATENT DOCUMENTS

| | | | |
|---|---|---|---|
| 5,313,626 A | 5/1994 | Jones et al. | |
| 5,530,829 A | 6/1996 | Beardsley et al. | |
| 5,570,332 A | 10/1996 | Heath et al. | |
| 5,584,007 A | 12/1996 | Ballard | |
| 5,636,355 A | 6/1997 | Ramakrishnan et al. | |
| 5,664,143 A | * 9/1997 | Olbrich | ............ 711/112 |
| 5,664,145 A | 9/1997 | Apperley et al. | |
| 5,727,183 A | 3/1998 | Takahashi | |
| 5,829,018 A | 10/1998 | Moertl et al. | |
| 5,875,455 A | 2/1999 | Ito | |
| 6,164,840 A | 12/2000 | Lynch | |
| 6,189,080 B1 | 2/2001 | Ofer | |
| 6,574,676 B1 | * 6/2003 | Megiddo | ............ 710/5 |

* cited by examiner

*Primary Examiner*—Kevin L. Ellis
(74) *Attorney, Agent, or Firm*—Fellers, Snider, et al.

(57) ABSTRACT

Apparatus and method for transferring data between a disc drive data storage device and a host device. Access commands are provided by the host device to the data storage device to read and write data. Write caching is employed so that the write data are temporarily stored in a buffer. A phase time (access time) is determined for each pending access command, and the access commands are executed in relation to the identified phase times. However, when the total amount of accumulated write data in the buffer exceeds a first threshold, a thread of write commands having an intermediary phase time less than a selected duration is selected and written in lieu of other pending access commands. When the total amount of accumulated write data exceeds a second threshold, as many write commands are serviced as possible during a preselected purge time.

20 Claims, 7 Drawing Sheets

OPTIMIZING DATA TRANSFER PERFORMANCE THROUGH PARTIAL WRITE COMMAND PURGING IN A DISC DRIVE

RELATED APPLICATIONS

This application claims priority to U.S. Provisional Application No. 60/322,823 filed Sep. 17, 2001.

FIELD OF THE INVENTION

The claimed invention relates generally to the field of disc drive data storage devices, and more particularly, but not by way of limitation, to an apparatus and method for optimizing the transfer of data between a host device and a disc drive using an access command sort strategy that involves partial purging of write commands based on the amount of write data pending in a buffer.

BACKGROUND

A disc drive is a data storage device used to store digital data. A typical disc drive includes a number of rotatable magnetic recording discs that are axially aligned and mounted to a spindle motor for rotation at a high constant velocity. A corresponding array of read/write heads access fixed sized data blocks (sectors) on tracks of the discs to write data to and to read data from the discs.

Disc drives are provided with servo control circuitry to move the heads to the various tracks, read/write channel circuitry to write data to and read data from the discs, and interface control circuitry to facilitate communication and data transfer with a host device. A disc drive is typically configured to operate in accordance with an industry standard interface protocol, such as Small Computer Systems Interface (SCSI). Communications and data transfers are carried out between host and drive in accordance with this protocol.

Disc drives of the present generation typically accommodate command queuing, which allows multiple input/output (I/O) commands to be received in a command queue and executed by the drive in an order different than that received. SCSI protocols currently support up to 256 pending commands in the command queue. A search strategy is used to execute the commands in an order that will provide the highest transfer rate. For example, if several commands require access to data blocks close to the current position of the heads, and other commands require access to data blocks at distant locations on the discs, the drive may proceed to execute all of the local accesses before moving the heads to the distant locations and accessing the data blocks at the distant locations to minimize seek time (i.e., time spent moving from one track to the next).

The time required for a particular data block to rotate around and reach the head (latency) is an important factor when selecting the execution order, as delays in waiting for the disc to rotate significantly decrease the resulting transfer rate. Selection of the execution order typically includes estimating how much time it would take to reach each of the data blocks associated with the pending access commands based on latency and the time required to perform any necessary head switches and seeks.

A disc drive can typically employ various run-time selectable strategies (parameters) to improve data transfer performance, such read on arrival (ROA) and read look ahead (RLA). ROA and RLA generally entail reading data blocks and placing the contents into the data buffer even though the host has not specifically requested the data from such data blocks, on the basis that the host may request the data in the near future.

ROA involves performing a seek command to move the head to a destination track on which a target data block resides, and commencing to read the preceding data blocks on the track until the target data block reaches the head. By contrast, RLA involves receiving a command to move to a new target track, but because the target data block is a large angular distance away from the head, the drive delays seeking to the new track and instead maintains the head on the current track and reads additional data blocks on the current track before moving to the destination track and reading the target data block. The foregoing strategies can provide improved performance under certain circumstances, such as when the command stream has a high degree of locality.

Another run-time selectable parameter that can improve data transfer performance is write caching. Write caching involves delaying the writing of data received from the host in favor of execution of other previously requested accesses (as opposed to immediately writing the data upon receipt). Advantages associated with write caching include the fact that more commands are available to choose from during the sorting strategy, which statistically improves overall access times. Having more write commands pending in the command queue improves the possibility of combining multiple adjacent write commands into a single, larger write operation, thereby reducing the total number of physical disc accesses required to write the data. Another advantage of write caching is that a command complete status is immediately conveyed to the host device upon the loading of the write data into the buffer.

However, allowing write data to linger in the buffer presents some disadvantages as well. Besides the risk of loss of data in the event of a power outage or other anomalous condition, the presence of large amounts of accumulated write data in the buffer takes up valuable space that could be utilized for readback data. Also, controller firmware routines typically only allow a maximum aging of any pending write command; thus, a substantial drop in observed data transfer rate may occur if the interface circuit is forced to service a large number of write commands to purge old write data to the discs.

Accordingly, there is a need for improvements in the art to provide effective control of cached write data in a disc drive to maximize data transfer performance, stabilize and minimize write command response time, and reduce the penalty encountered through the addition of new access commands to the command queue. It is to such improvements that the present invention is directed.

SUMMARY OF THE INVENTION

In accordance with preferred embodiments, a disc drive data storage device is provided which includes at least one data transducing head adjacent a data recording surface of a rotatable disc. Data are stored on the data recording surface in a number of blocks ("sectors"). A hardware and/or firmware based interface circuit includes a data buffer to temporarily store data being transferred between the data recording surface and the host device. A control processor operates in conjunction with the interface circuit to direct the transfer of data.

The interface circuit receives access commands from the host device including read commands identifying read data to be retrieved from the disc drive data storage device and write commands identifying write data to be stored by the data storage device. Write caching is activated so that the write data are temporarily stored in the buffer pending subsequent execution of the associated write commands.

A phase time is identified for each pending access command as an elapsed time to configure the data storage device to initiate servicing of the access command. The access commands are executed in an order selected in relation to the identified phase times, with an emphasis on executing the pending access command having the shortest phase time. This is referred to herein as mode 1 operation.

The interface circuit continuously monitors the total amount of write data that accumulates in the buffer. When the total amount of accumulated write data reaches a first selected threshold, the interface circuit transitions to what is referred to as mode 2 operation.

During mode 2, an intermediary phase interval between the completion of each write command and the start of each remaining write command is determined to identify a thread of write commands having an associated intermediary phase interval less than a predetermined phase interval level. If such a thread is located, the interface circuit proceeds to execute the write commands in the thread. This occurs even if another read or write command potentially has a smaller phase time than the first write command in the thread. If multiple threads are identified, the interface circuit will either execute a subset of the threads (leaving some threads for future execution at a later time), or will proceed to execute all of the threads in turn. If no threads are identified, the circuit proceeds as before to execute the next command based on phase time.

Preferably, when write data continues to accumulate in the buffer to the point where the total amount of write data exceeds a second threshold greater than the first threshold, the circuit transitions into mode 3 operation. During mode 3, a preselected purge time is identified and as many write commands are serviced as possible during the preselected purge time in lieu of any pending read commands. The preselected purge time is preferably identified in terms of disc rotations (i.e., 1.0, 1.5, 2.0 revolutions, etc.).

This tiered approach allows the disc drive to achieve optimal data transfer rates and to maintain the amount of accumulated write data at manageable levels.

These and various other features and advantages which characterize the claimed invention will be apparent upon reading the following detailed description and upon review of the associated drawings.

BRIEF DESCRIPTION OF THE DRAWINGS

FIG. 6 is a flow chart for a SORT STRATEGY routine that is a subroutine of the DATA TRANSFER routine of FIG. 5.

DETAILED DESCRIPTION

Figure 1:
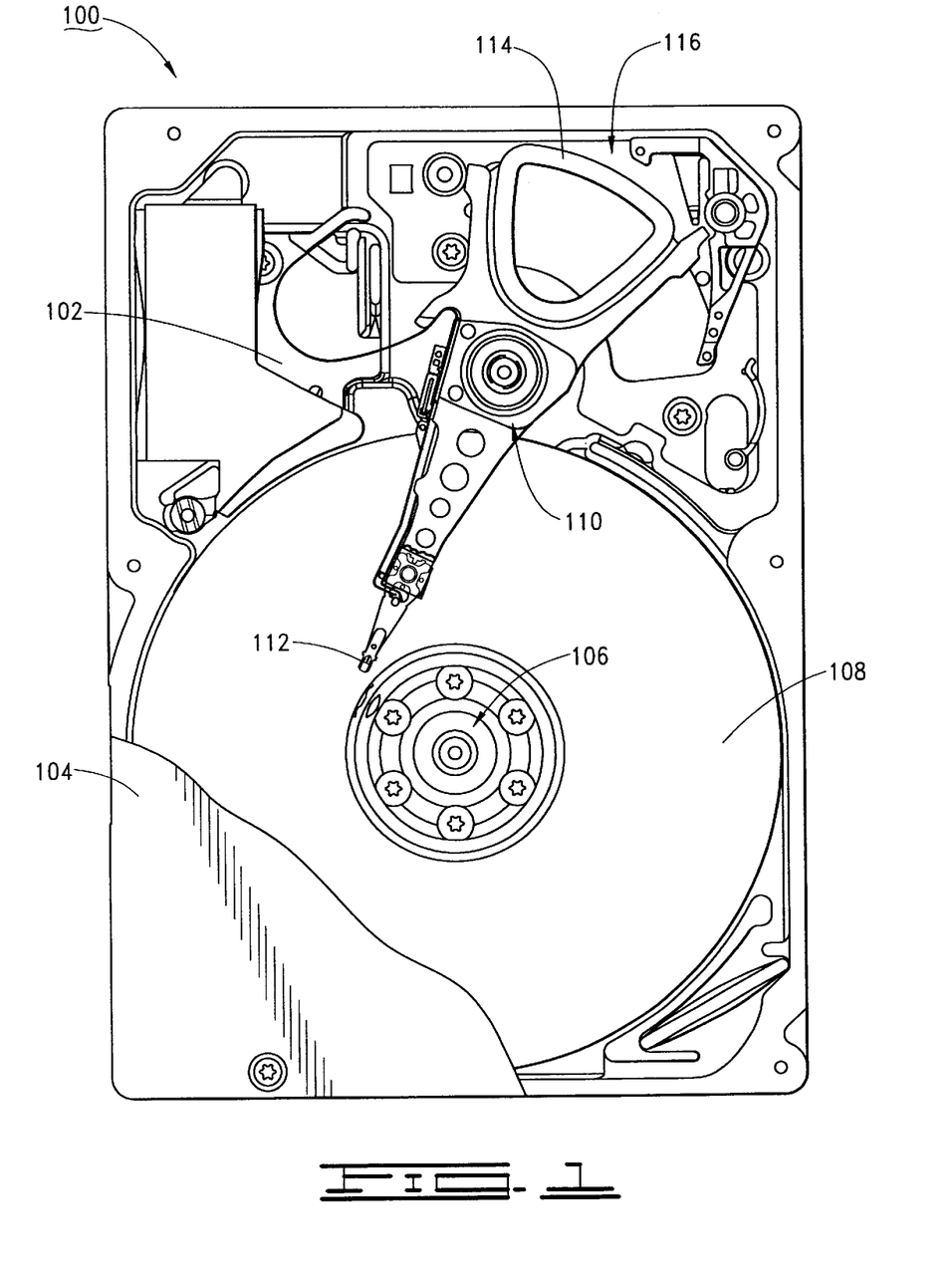
FIG. 1 is a plan view of a disc drive constructed and operated in accordance with preferred embodiments of the present invention.

Referring now to the drawings, FIG. 1 provides a top plan view of a disc drive 100 of the type used to store and retrieve computerized data. The disc drive 100 includes a rigid base deck 102 which cooperates with a top cover 104 (shown in partial cutaway) to form a sealed housing for the drive. Electrical communication and control electronics are provided on a disc drive printed circuit board (PCB) affixed to the underside of the base deck 102 (and hence, not visible in FIG. 1).

A spindle motor 106 rotates a number of rigid data recording discs 108 at a constant high speed. A rotary actuator 110 is positioned adjacent the discs 108 and supports a corresponding array of read/write data transducing heads 112. The actuator 110 is rotated through application of current to an actuator coil 114 of a voice coil motor (VCM) 116.

Figure 2:
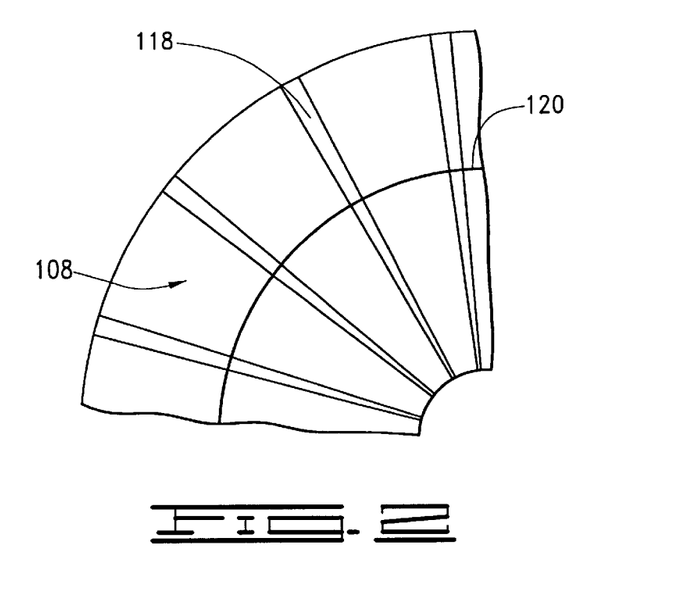
FIG. 2 shows the manner in which embedded servo data are arranged on each of the disc recording surfaces of the disc drive of FIG. 1.
Figure 3:
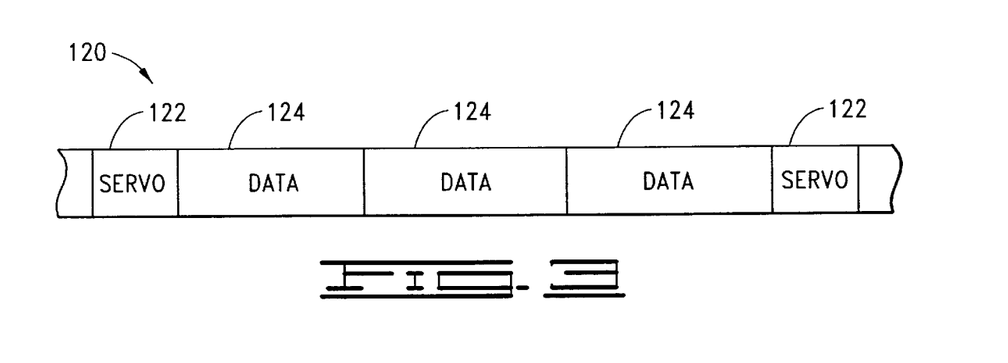
FIG. 3 shows the general format of each track on the disc recording surfaces.

FIGS. 2 and 3 generally illustrate the manner in which servo data are stored on the disc surfaces, the servo data enabling servo control circuitry to detect head position and velocity in order to position the actuator in a desired relation to the discs. The servo data are written using a servo track write (STW) process during disc drive manufacturing and are arranged in a plurality of radially extending servo wedges 118. Each wedge 118 comprises a plurality of adjacent servo fields 122 that are radially aligned to define each of the tracks on the disc surface (a portion of one such track is represented at 120 in FIGS. 2 and 3).

User data fields 124 (also "data sectors" or "sectors") are defined between adjacent servo fields 122 during a disc drive formatting operation. It will be recognized that the data sectors 124 are typically much longer than the servo fields 122 in order to maximize data capacity, so the aspect ratios and relative lengths of the fields in FIG. 3 are not represented to scale.

Figure 4:
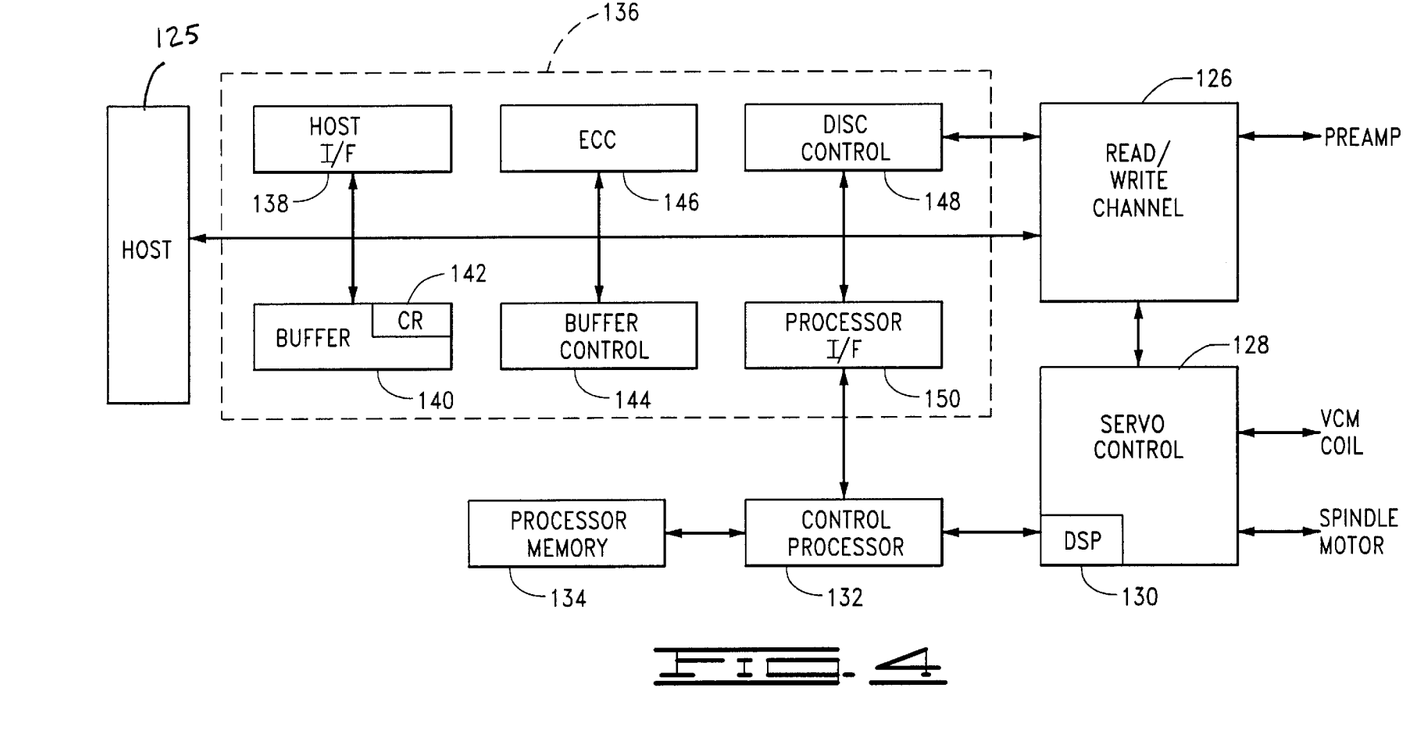
FIG. 4 is a functional block diagram of communication and control electronics of the disc drive of FIG. 1.

FIG. 4 provides a functional block diagram of the disc drive 100 in conjunction with a host device 125. FIG. 4 includes a read/write channel 126, a servo control circuit 128 with programmable digital signal processor (DSP) 130, top level control processor 132 with associated memory 134, and hardware and/or firmware based interface control circuitry 136.

The read/write channel 126 operates as a communication channel to encode input data to be written to the discs 108 and to decode amplified readback signals to reconstruct data retrieved from the discs 108.

The servo control circuit 128 operates to demodulate head position and velocity from the servo data from the servo fields 122 (FIG. 3) and applies currents to rotate the actuator assembly 110 accordingly. The servo control circuit 128 further provides drive currents to the spindle motor 106 to rotate the discs 108 at operational speed during drive operation. For purposes of the present discussion, it will be contemplated that the servo control circuit 128 rotates the spindle motor 106 at a nominal operational speed of 10,000 revolutions per minute (rpm).

The control processor 132 provides top level control for the disc drive 100 in accordance with programming steps stored in processor memory 134 and host commands provided by the host device 125.

The interface control circuitry 136 includes a host interface (I/F) circuit 138 that controls the transfer of data and commands between the disc drive 100 and the host. A buffer 140 temporarily stores data that are being transferred between the host and the discs 108. A command queue 142 stores pending access command instructions (command nodes) associated with the data stored in the buffer 140. A buffer control circuit 144 controls the flow of data in and out of the buffer 140.

An error correction circuit (ECC) 146 applies on-the-fly error detection and correction algorithms to the retrieved data to correct detected errors in the retrieved data in the buffer 140. A disc control circuit 148 sequences the read and write operations by the read/write channel 126. A processor interface (I/F) 150 provides a communication path with the control processor 132.

For purposes of the present discussion, it will be contemplated that the interface circuitry 136 uses the Small Computer System Interface (SCSI) host interface protocol, although such is not limiting to the scope of the invention as claimed below. Hence, the command queue 142 can accommodate up to a maximum number of pending access commands from the host (such as 64 or 256).

One type of access command is a write command from the host to write one or more blocks of data loaded into the buffer 140 by the host to one or more associated sectors 124 (FIG. 3) on a selected disc surface; another type of access command is a read command from the host to retrieve the contents of one or more selected sectors 124 (FIG. 3) on a selected disc surface to the buffer 140 for subsequent transfer to the host. It will be noted that the host employs logical block addresses (LBAs) to identify the desired sectors 124, and the control processor 132 converts each LBA to a physical block address (PBA) to identify the cylinder, disc surface and angular location of the desired sector.

Figure 5:
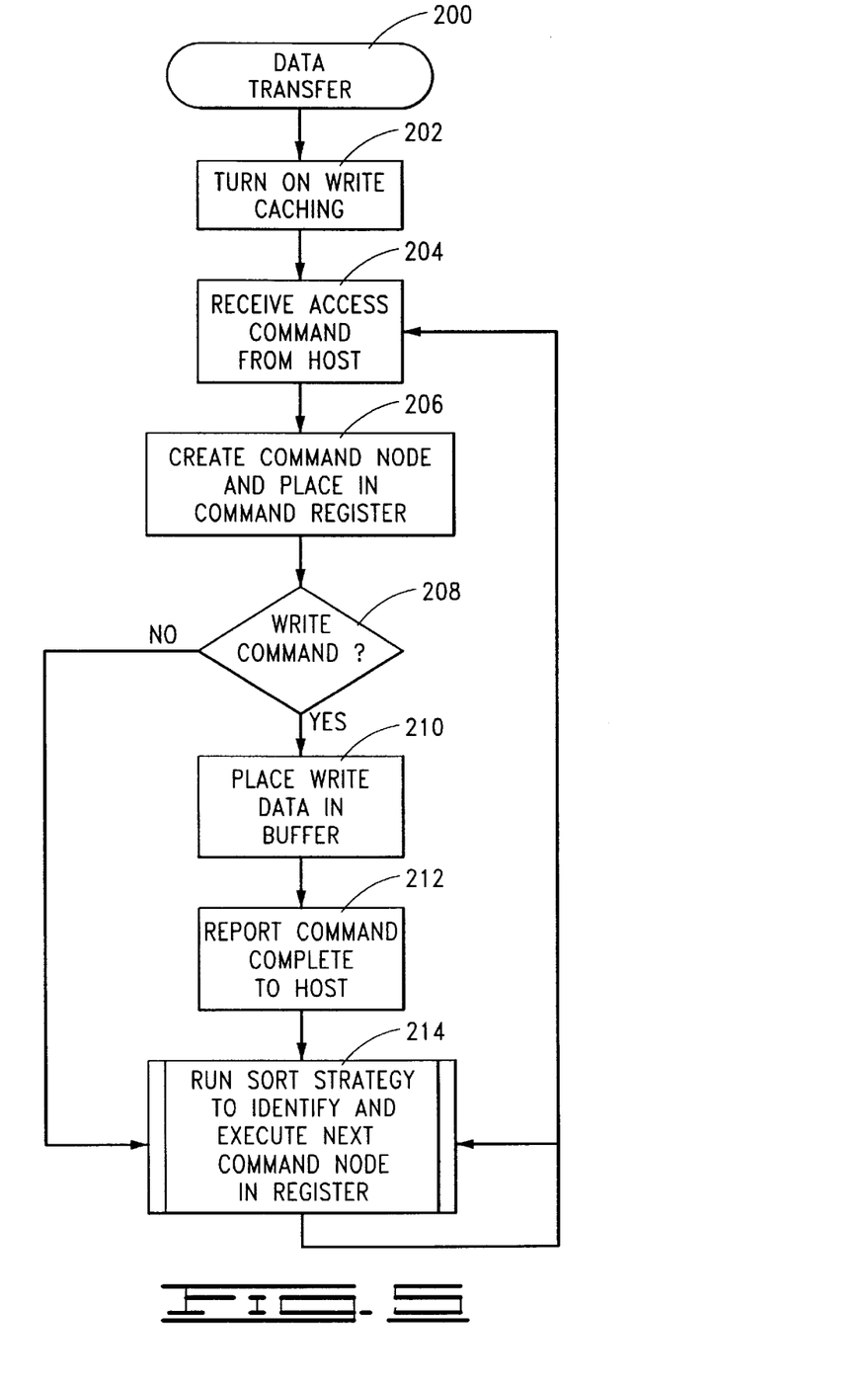
FIG. 5 is a flow chart for a DATA TRANSFER routine, generally illustrative of steps carried out by the disc drive out in accordance with preferred embodiments of the present invention to transfer data between the discs and a host device.

The flow chart of FIG. 5 shows a DATA TRANSFER routine 200, generally illustrative of steps carried out in accordance with preferred embodiments of the present invention to transfer data from a host to the disc drive 100.

Write caching is initially turned on as shown at step 202. As discussed above, write caching involves temporarily storing write data in the buffer 140 pending transfer of the write data to the discs at a later time (as opposed to immediately writing the data as when write caching is turned off).

During operation, the host will issue access commands from time to time at a rate determined by the needs of the host. Thus, there can be times when access commands are issued relatively infrequently and other times when a large number of access commands are issued in rapid succession. Each read access command identifies the LBAs on the discs 108 the contents of which the host requires the disc drive 100 to retrieve. Each write access command includes the write data that the host requires the disc drive 100 to store and identifies the specific LBAs in which the disc drive is to store the write data.

Receipt of each new access command is represented at step 204. In response to each new access command, the interface circuit 136 creates a command node as a sortable access instruction in the command queue 142. Decision step 208 inquires whether the new access command is a write command; if so, the interface circuit 136 places the write data in the buffer 140 pending transfer to the discs (step 210) and reports that the write command has been completed (step 212). The foregoing steps are not performed, of course, if the access command is a read command. Write data in the buffer 140 pending transfer to the discs 108 is also referred to as "writeback data."

The routine then proceeds to step 214 where a SORT STRATEGY routine is performed to identify and execute the next appropriate command node in the command queue 142. The operation of steps 204 and 214 are asynchronous; new commands will be received from time to time at step 204 as dictated by the host and the sort strategy step 214 will continue to sequentially select and execute command nodes in the command queue 142 so long as at least one command node remains in the queue.

It will be noted that with write caching on, the drive proceeds to inform the host that the write command has been completed, even though the write data are actually still pending in the buffer. Advantages of this approach include the fact that the host will not make further inquiries to the drive or halt further processing as the host waits to hear that the write command has been completed; also, the observed data transfer rate (at the bus between host and drive) will be higher at that point since the drive immediately reports that the write command has been completed.

A disadvantage with this approach, however, is that the drive must schedule the write operation in the near future and will not get credit from a data transfer rate perspective for the time during which the write operation is performed. Thus, if a large number of cached write commands are allowed to accumulate in the buffer 140, the observed data transfer rate will drop significantly as the drive takes the necessary time to write the data to the discs.

The SORT STRATEGY routine 214 takes these and other considerations into account, as shown by the flow of FIG. 6. As explained in greater detail below, the routine identifies and executes command nodes in the command queue 142 using different strategies based on the amount of write data pending in the buffer 140. This can be generally observed from a review of FIG. 7, which graphically represents three different potential conditions during the operation of the routine of FIG. 6.

Figure 7:
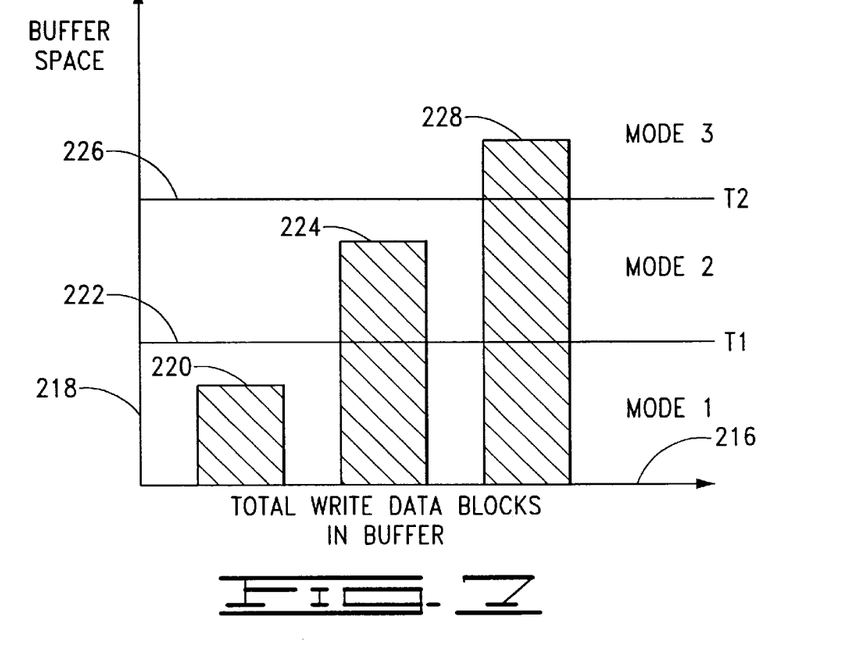
FIG. 7 is a graphical representation showing different modes of operation of the interface circuit of FIG. 4 in accordance with preferred embodiments of the present invention.

The graph of FIG. 7 includes an x-axis 216 indicative of the total number of write data blocks in the buffer 140 and a y-axis 218 indicative of the total available buffer space. Vertical block 220 represents a condition wherein the total amount of pending write data is less than a first selected threshold T1 (indicated at line 222). This is referred to as mode 1 and conventional sorting of the pending command nodes takes place during this mode.

Vertical block 224 in FIG. 7 represents another condition (mode 2) wherein the total amount of pending write data in the buffer 140 is greater than the threshold T1 (222), but is less than a second threshold T2 (indicated at line 226). During mode 2, write command nodes are executed if two or more such commands can be combined into a thread and performed within a minimum intermediary elapsed time (phase) between the commands.

Vertical block 228 represents yet another condition (mode 3) wherein the total amount of pending write data in the buffer 140 is greater than the threshold T2 (226). During mode 3, a purge time of selected duration is selected and as many pending write commands as possible are serviced during this purge time.

It will be noted that the buffer 140 is preferably organized using a number of variable length fragments (such as 256 fragments). The data associated with each access command are generally assigned to a different fragment within the buffer 140. Thus, the graph of FIG. 7 can be viewed in terms of total number of allocatable fragments (such as 256) within the buffer 140 to which read or writeback data can be assigned, and the thresholds T1 and T2 can be viewed as respective numbers of different fragments (such as 64 and 128) to which writeback data waiting transfer to the discs 108 have been assigned. It will be noted that in both cases, the thresholds are determined in relation to a total amount of writeback data accumulated in the buffer 140.

Returning to the flow of FIG. 6, the routine proceeds with an inquiry at decision step 230 to ascertain whether the total write data in the buffer is above the threshold T1. If not, the routine enters mode 1 operation and proceeds to sort and select the next command node in the command queue 142 based on the minimum access time (phase time) required for each node, as shown by step 232.

Figure 8:
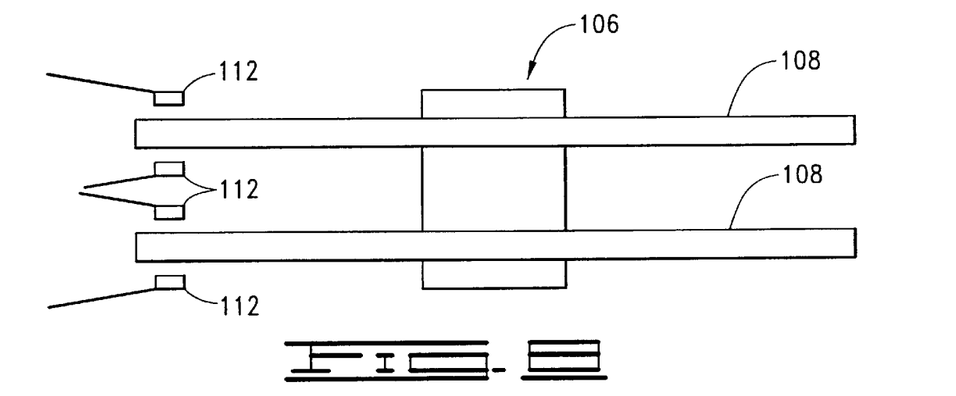
FIG. 8 is an elevational representation of two discs and four heads of the disc drive.
Figure 9:
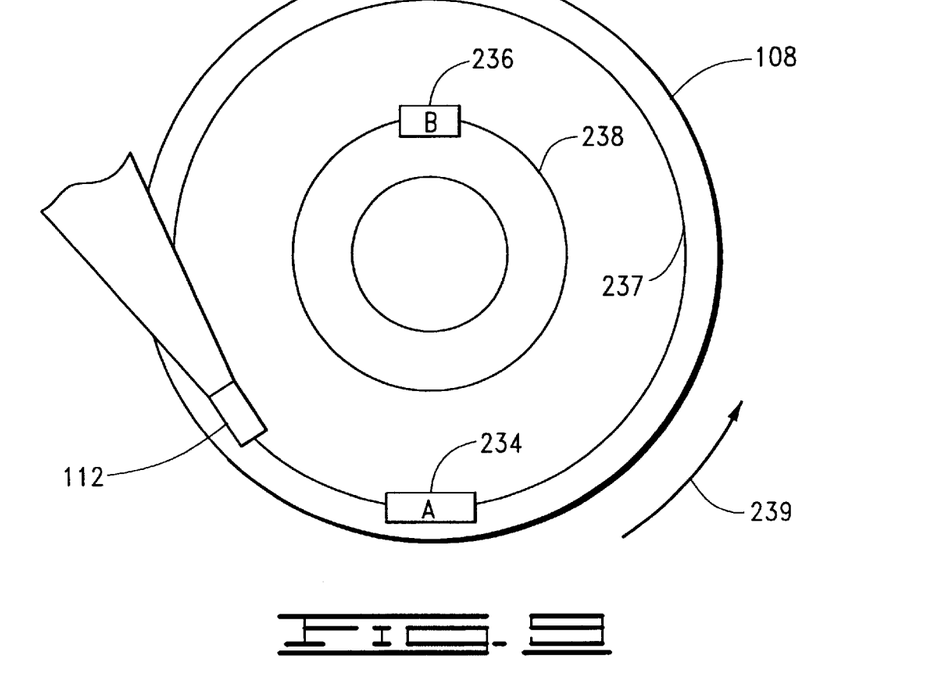
FIG. 9 is a plan view of a selected disc to illustrate sorting strategies carried out to identify the next command node for execution based on minimum phase (access time).

Phase time calculations can be demonstrated with a review of FIGS. 8–9. FIG. 8 shows the spindle motor hub 106 with two discs 108 and four associated transducing heads 112. FIG. 9 shows a selected disc surface of one of the discs 108 and the associated head 112. As will be recognized, at any given time the required phase to each pending command node is a function of which head 112 is currently selected, the initial position of the selected head 112, the radial location of the track on which the starting LBA associated with the command node is disposed, and the angular position of the starting LBA associated with the command node with respect to the selected head 112.

To service any given command node, the disc drive 100 may require a head switch operation to switch to another head, a seek operation to move the selected head to the destination track, and a latency delay while the drive waits for the first LBA associated with the command node to rotate around and reach the head. Of all these considerations, the latency delay is often the most important factor.

A simple example to illustrate these considerations can be viewed in FIG. 9. Assume that blocks "A" and "B" 234, 236 represent starting LBAs associated with pending command nodes in the command queue 142. Both the block "A" 234 and the selected head 112 are on a common track 237, and block "B" 236 is on a distant track 238. A direction of disc rotation is shown by arrow 239.

Since the head 112 is already over a track containing an LBA associated with a pending command node, one option is to simply remain on track and wait the required latency time for block "A" to reach the head 112. However, if the time for block "B" 236 to rotate around to a position angularly aligned with the head is less than the time required for a seek operation to move the head 112 to track 238, then a better option might be to select the command node associated with block "B" 236, since block "B" 236 has a shorter phase than block "A."

Accordingly, the operation of step 232 in FIG. 6 results in the calculation of the phase to each pending command node in the command queue 142 as the estimated time that would be required to configure the drive to initiate servicing the command. Generally, the command node having the smallest required phase time is executed at step 240 and the routine returns to the flow of FIG. 5 at step 241. A suitable search strategy during mode 1 operation is described in U.S. Pat. No. 5,570,332 issued to Heath, et al. It will be noted that both read commands and write commands are serviced during step 240.

The foregoing process is continued until such time that the total amount of write data that has accumulated in the buffer 140 exceeds the threshold T1, after which the flow of FIG. 6 proceeds to decision step 242, which inquires whether the total amount of write data also exceeds the threshold T2. If not, the routine enters mode 2 and passes to step 244.

In step 244, the interface circuit 136 attempts to form one or more threads among the various pending write command nodes. This is carried out by determining the state of the drive (i.e., the radial position of the heads 112 and the angular position of the discs 108) at the end of each of the pending write command nodes and calculating the subsequent intermediary phase interval from that point to the beginning of each of the remaining write command nodes. This can be understood with a review of FIG. 10 which represents a first selected set of pending write data 246 ("WRITE DATA 1") and a second selected set of pending write data 248 ("WRITE DATA 2").

Figure 10:
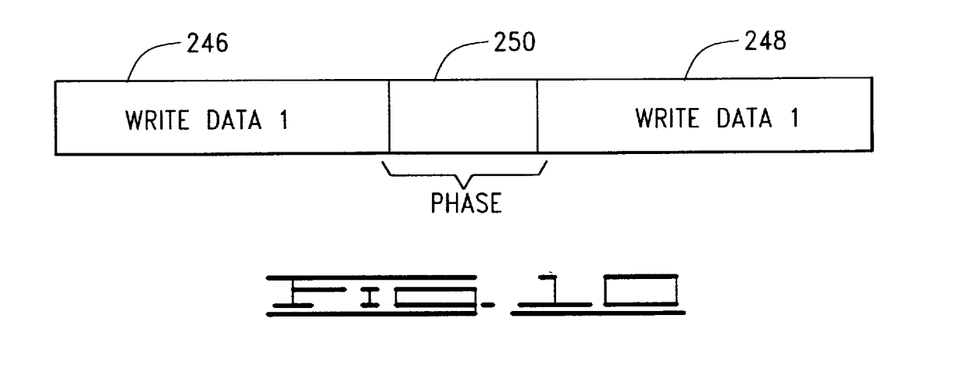
FIG. 10 represents a thread of two write command nodes in which the associated write data can be written with an acceptable intermediate phase between the end of a first write data set and the beginning of a second write data set.

The write data sets 246, 248 are each associated with a different pending write command node. If the intermediary phase interval (indicated by interval 250) between the completion of the writing of the first set of write data 246 and the beginning of the writing of the second set of data 248 is less than a specified duration, for example 3 milliseconds, then a thread is formed between the respective command nodes.

The thread is based on required intermediary phase interval (access time) and is not necessarily dependent upon the LBA values of the write data. Although not shown in FIG. 10, it will be understood that if a third set of write data could be written within the specified phase interval at the conclusion of the writing of the second set of data 248, then the thread would be extended to include this third set of write data as well. Depending upon the time proximity of the write data, it is contemplated that a plurality of different threads may be identified involving different pending write command nodes.

Decision step 252 determines whether any threads were identified during step 244; if not, the routine passes to step 232 for conventional sorting of all of the pending command nodes as before. However, if one or more threads are identified, the routine passes to step 254 wherein a single thread or multiple threads identified during step 244 are executed. The routine then passes back as before.

Execution of a thread during step 254 may involve foregoing the opportunity to execute a pending read or write command node having a smaller phase time. For example, there may be a pending read command node that could be serviced in 2 ms whereas the time required to begin servicing the first data set in the thread might be 5 ms. However, once the drive enters mode 2 of operation, it is deemed preferable to proceed with the execution of the thread on the basis that multiple write command nodes are flushed from the command queue 142 and the amount of write data in the buffer 140 is reduced.

When multiple threads are identified at step 244, in one preferred embodiment the routine proceeds to select and execute a single thread or a subset of the threads based on various factors (e.g., length, total data, amount of "dead phase," etc.). This is based on the observation that the intermediary phase among any existing, nonwritten threads will not change. There is also a small possibility that the next time through the process additional write commands may be available to append to an existing thread.

In an alternative preferred embodiment the routine operates at step 254 to sequentially write all of the threads identified in step 244. Advantages associated with this latter approach include the elimination of the need to reperform the calculations needed to identify or reevaluate the threads on a next pass through the routine, as well as the fact that a larger amount of write data can be flushed from the buffer 140.

Depending upon the types and quantities of access commands issued by the host, it is contemplated that in most cases the operation of the routine in mode 2 will help to maintain the amount of pending write data at an acceptable level and promote the majority of the operation of the interface circuit 136 in mode 1. However, it is also contemplated that under certain circumstances the amount of pending write data will accumulate to the point where the second threshold T2 is exceeded, in which case the routine will transition to mode 3. At this point the flow of FIG. 6 passes from decision step 242 to step 256 wherein a designated period ("purge time") is identified. This period can be any suitable duration and is preferably established in terms of disc revolutions (i.e. 1.0, 1.5, 2.0 revolutions, etc.).

The interface circuit 136 proceeds at step 258 to execute only write command nodes for the designated period, thereby freeing buffer space in an effort get back to a lower mode of operation. The routine then returns as before.

The routine of FIGS. 5 and 6 enact a balance between the need to obtain faster overall data transfer times and the need to maintain the level of pending write data at manageable levels. Although not specifically included in the flows of FIGS. 5 and 6, it will be understood that the interface circuit 136 assigns and tracks an aging constraint for each write command node which gives an absolute limit as to the time in which the write command must be satisfied. It is contemplated, however, that the tiered approach among the various modes will enable all write commands to be purged in a timely manner well before such maximum aging restrictions come into play.

It will now be understood that the present invention is generally directed to a method and apparatus for transferring data between a data storage device and a host device. In accordance with preferred embodiments, a disc drive (such as 100) includes a data transducing head (such as 112) controllably positionable adjacent a data recording surface (such as 108) on which data are stored in a number of blocks (such as 124). An interface circuit (such as 136) comprises a data buffer (such as 140) to temporarily store data being transferred between the data recording surface and the host device. A control processor (such as 132) operates in conjunction with the interface circuit.

The interface circuit receives access commands from the host device including read commands identifying blocks of read data to be retrieved to the host device and write commands identifying blocks of write data to be stored by the data storage device (such as by step 204). Write caching is activated (such as by step 202) so that the blocks of write data are temporarily stored in the buffer (such as by step 212).

A phase time is identified for each access command as an elapsed time to configure the data storage device to initiate servicing of the access command (such as by step 232), and the access commands are executed in an order selected in relation to the identified phase times (such as by step 240). This is referred to as mode 1 operation (such as 220 in FIG. 7).

The interface circuit monitors the total amount of accumulated blocks of write data in the buffer. When the total amount of accumulated write data reaches a first selected threshold, the interface circuit transitions to mode 2 operation (such as 224). During mode 2, an intermediary phase interval between the completion of each write command and the start of each remaining write command is determined to identify one or more threads of write commands each having an associated intermediary phase interval less than a predetermined phase interval level (such as by step 244). At least one of the threads is written in lieu of another read or write command having a smaller phase time (such as by step 254).

Preferably, when the total amount of write data reaches a second threshold greater than the first threshold, the circuit transitions into mode 3 operation (such as 228). During mode 3, a preselected purge time is identified (such as by step 256) and as many write commands are serviced as possible during the preselected purge time in lieu of any pending read commands (such as by step 258).

Preferably, the interface circuit further comprises a command queue 142 and the interface circuit generates a command node for each access command and places the command nodes in the command queue for sorting and execution (such as by step 206).

For purposes of the appended claims, the recited "first means" will be understood as corresponding to the disclosed control processor 132 having associated programming in memory 134 to direct the transfer of data in accordance with the routines of FIGS. 5 and 6. Although method claims presented below are provided with steps in a particular alphanumeric order, the claims are not necessarily limited to the order of steps as presented.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application for the optimization of data transfer and sort strategy methodology while maintaining the same functionality without departing from the spirit and scope of the present invention.

In addition, although the embodiments described herein are directed to a disc drive data handling device, it will be appreciated by those skilled in the art that the methodology can readily be adapted to other systems in which data transfer takes place without departing from the spirit and scope of the claimed invention.

What is claimed is:

1. A method comprising:
   providing access commands from a host device to a data storage device, said commands comprising read commands and write commands;
   delaying writing of write data associated with said write commands to a storage medium of said data storage device by temporarily storing the write data in a buffer and the write commands in a command queue; and
   when a total amount of write data in the buffer is above a first selected threshold, determining, for each command in the command queue, a phase interval between completion of each write command in the command queue and start of each remaining write command in the command queue, identifying a thread of write commands having an associated phase interval less than a predetermined phase interval level, and writing the thread of write commands to said medium.

2. The method of claim 1, further comprising:
when the total amount of accumulated write data in the buffer is above a second selected threshold greater than the first selected threshold, identifying a preselected purge time and servicing a number of the write commands during the preselected purge time in lieu of any pending read commands.

3. The method of claim 1, wherein multiple threads of write commands are identified when the total amount of write data is above the first selected threshold, and wherein less than all of the multiple threads are sequentially executed.

4. The method of claim 1, wherein multiple threads of write commands are identified when the total amount of write data is above the first selected threshold, and wherein all of the threads are sequentially written in turn.

5. The method of claim 1, further comprising generating a command node for each access command and storing the command nodes in a command queue.

6. In a data storage device a method comprising:
identifying a phase time as an elapsed time to configure a data storage device for servicing each of a plurality of access commands received from a host device;
determining whether a thread can be formed between a first write command of said access commands associated with a first set of blocks of write data and a second write command of said access commands associated with a second set of blocks of write data, wherein said thread can be formed when an elapsed time between the completion of the storage of the first set of blocks of write data and the beginning of the storage of the second set of blocks of write data is less than a preselected phase interval;
when no thread is formed, executing a selected access command having the minimum phase time as determined; and
when a thread is formed, executing the thread so that the first and second write commands are serviced in lieu of the selected access command having the minimum phase time.

7. The method of claim 6, further comprising comparing the total amount of write data in the buffer to a first threshold level, and performing the determining step when the total amount of write data exceeds the first threshold level.

8. The method of claim 7, further comprising comparing the total amount of write data to a second threshold level greater than the first threshold level, and servicing as many of the write commands as possible in lieu of any other pending access commands during a preselected purge time when the total amount of write data exceeds the second threshold level.

9. The method of claim 6, wherein the determining step further comprises the inclusion of a third access command associated with a third set of write data in the thread when an elapsed time between the completion of the storage of the second set of write data and the beginning of the storage of the third set of write data is less than the preselected phase interval.

10. A disc drive data storage device configured to store and retrieve data from a host device, comprising:
a data transducing head controllably positionable adjacent a data recording surface on which data are stored;
an interface circuit coupled to the head and the host device and comprising a data buffer to temporarily store data being transferred between the data recording surface and the host device, wherein the interface circuit receives and places in a command queue access commands from the host device including read commands identifying read data to be retrieved to the host device and write commands identifying write data to be stored by the data storage device; and
a control processor coupled to the interface circuit which directs execution of a number of pending access commands in the command queue by the interface circuit by:
identifying a phase time for each access command as an elapsed time to configure the data storage device to initiate servicing of the access command;
when the total amount of write data in the buffer is below a first selected threshold, executing the access commands in an order selected in relation to the identified phase times; and
when the total amount of write data in the buffer is above the first selected threshold, determining an intermediary phase interval between the completion of each write command in the command queue and the start of each remaining write command in the command queue, identifying a thread of write commands having an associated intermediary phase interval less than a predetermined phase interval level, and executing the thread of write commands in lieu of another read or write command having a smaller phase time.

11. The disc drive data storage device of claim 10, wherein the control processor further directs execution of the number of pending access commands by:
when the total amount of write data in the buffer is above a second selected threshold greater than the first selected threshold, identifying a preselected purge time and servicing a number of the write commands in lieu of any pending read commands.

12. The disc drive data storage device of claim 10, wherein multiple threads of write commands are identified by the determining step, and wherein the interface circuit proceeds to execute a selected thread of write commands having the smallest phase time.

13. The disc drive data storage device of claim 10, wherein multiple threads of write commands are identified by the interface circuit during the determining step, and wherein the interface circuit proceeds to sequentially execute all of the threads of write commands in turn.

14. The disc drive data storage device of claim 10, wherein the interface circuit further comprises a command queue into which the interface circuit places command nodes associated with each of the pending access commands, and wherein the interface circuit operates to sort the command nodes for sequential execution of the associated access commands.

15. A disc drive data storage device configured to store and retrieve data from a host device, comprising:
a data transducing head controllably positionable adjacent a data recording surface on which data are stored;
an interface circuit coupled to the head and the host device and comprising a data buffer to temporarily store data being transferred between the data recording surface and the host device, wherein the interface circuit receives access commands from the host device including read commands identifying read data to be retrieved to the host device and write commands identifying write data to be stored by the data storage device; and first means for directing execution of a number of pending access commands by the interface circuit to obtain an increased data transfer rate and to limit accumulation of write data in the buffer.

16. The disc drive data storage device of claim 15, wherein the interface circuit places said pending access commands in a command queue, and wherein the first means comprises a control processor coupled to the interface circuit and having associated programming to carry out steps of:

identifying a phase time for each access command as an elapsed time to configure the data storage device to initiate servicing of the access command;

when the total amount of write data in the buffer is below a first selected threshold, executing the access commands in an order selected in relation to the identified phase times; and when the total amount of write data in the buffer is above the first selected threshold, determining an intermediary phase interval between the completion of each write command in the command queue and the start of each remaining write command in the command queue, identifying a thread of write commands having an associated intermediary phase interval less than a predetermined phase interval level, and executing the thread of write commands in lieu of another read or write command having a smaller phase time.

17. The disc drive data storage device of claim 16, wherein the control processor further directs execution of the number of pending access commands by:

when the total amount of write data in the buffer is above a second selected threshold greater than the first selected threshold, identifying a preselected purge time and during which a number of the write commands are serviced in lieu of any pending read commands.

18. The disc drive data storage device of claim 16, wherein multiple threads of write commands are identified by the determining step, and wherein the interface circuit proceeds to execute a selected thread of write commands having the smallest phase time.

19. The disc drive data storage device of claim 16, wherein multiple threads of write commands are identified by the interface circuit during the determining step, and wherein the interface circuit proceeds to sequentially execute all of the threads of write commands in turn.

20. The disc drive data storage device of claim 16, wherein the interface circuit further comprises a command queue into which the interface circuit places command nodes associated with each of the pending access commands, and wherein the interface circuit operates to sort the command nodes for sequential execution of the associated access commands.

* * * * *